United States Patent
Gandhi et al.

(10) Patent No.: US 10,682,903 B1
(45) Date of Patent: Jun. 16, 2020

(54) ACTIVE SEALS FOR VEHICLES

(71) Applicant: Toyota Motor Engineering & Manufacturing North America, Inc., Plano, TX (US)

(72) Inventors: Umesh N. Gandhi, Farmington Hills, MI (US); Danil V. Prokhorov, Canton, MI (US); Michael Paul Rowe, Pinckney, MI (US); Ryohei Tsuruta, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 15/929,070

(22) Filed: Dec. 18, 2018

(51) Int. Cl.
   *B60J 10/00* (2016.01)
   *B60J 10/74* (2016.01)
   (Continued)

(52) U.S. Cl.
   CPC ............. *B60J 10/244* (2016.02); *B60J 10/70* (2016.02); *B60J 10/80* (2016.02); *B60J 10/82* (2016.02);
   (Continued)

(58) Field of Classification Search
   CPC . B60J 10/244; B60J 10/80; B60J 10/82; B60J 10/10; B60J 10/84; B60J 10/74;
   (Continued)

(56) References Cited

U.S. PATENT DOCUMENTS 6,490,960 B1    12/2002    Jackson et al.
7,258,347 B2     8/2007    Keefe et al.
(Continued)

FOREIGN PATENT DOCUMENTS

JP    2007097292 A    4/2007
WO   2018175741 A1    9/2018

OTHER PUBLICATIONS

Acome et al., "Hydraulically Amplified Self-Healing Electrostatic Actuators with Muscle-Like Performance," Science, vol. 359, Issue 6371, pp. 61-65 (Jan. 5, 2018) (6 pages).
(Continued)

*Primary Examiner* — Dennis H Pedder
(74) *Attorney, Agent, or Firm* — Christopher G. Darrow; Darrow Mustafa PC

(57) ABSTRACT

An interface between two vehicle structures can be selectively sealed using an active seal. The active seal can include an outer casing and an actuator located within the outer casing. The actuator can include a bladder. The bladder can define a fluid chamber, which can contain a dielectric fluid. The actuator can include a first conductor and a second conductor operatively positioned on opposite portions of the bladder. The actuator can be activated and deactivated by selectively supplying electrical energy to the actuator. When electrical energy is supplied to the actuator, the actuator can have a reduced cross-sectional profile such that the interface is not sealed and movement of the second vehicle structure is not impeded by the seal. When electrical energy is not supplied to the actuator, the actuator can be in a non-activated condition in which the interface is substantially sealed.

20 Claims, 6 Drawing Sheets

(51) Int. Cl.
*B60J 10/82* (2016.01)
*B60J 10/84* (2016.01)
*B60J 10/244* (2016.01)
*B60J 10/70* (2016.01)
*B60J 10/86* (2016.01)
*B60J 10/80* (2016.01)
*B60J 10/88* (2016.01)
*B60J 10/50* (2016.01)

(52) U.S. Cl.
CPC ............... *B60J 10/84* (2016.02); *B60J 10/86* (2016.02); *B60J 10/88* (2016.02); *B60J 10/50* (2016.02)

(58) Field of Classification Search
CPC ... B60J 10/70; B60J 10/86; B60J 10/88; B60J 10/50
USPC ........... 296/146.9, 216.06–216.09; 49/477.1, 49/480.1; 277/628, 646, 645
See application file for complete search history.

(56) References Cited

U.S. PATENT DOCUMENTS

| | | | | |
|---|---|---|---|---|
| 7,484,735 | B2* | 2/2009 | Verbrugge | B60J 10/00 277/628 |
| 7,905,538 | B2* | 3/2011 | Ukpai | B60R 13/06 296/146.9 |
| 8,240,677 | B2* | 8/2012 | Browne | B60J 10/50 277/628 |
| 8,789,314 | B2 | 7/2014 | Alexander et al. | |
| 10,293,718 | B1 | 5/2019 | Ilievski et al. | |
| 2005/0198904 | A1* | 9/2005 | Browne | E05B 47/0009 49/374 |
| 2005/0206096 | A1* | 9/2005 | Browne | E05B 47/0009 277/628 |
| 2007/0046074 | A1 | 3/2007 | Satta et al. | |
| 2007/0246898 | A1* | 10/2007 | Keefe | E05B 47/0009 277/628 |
| 2009/0086331 | A1 | 4/2009 | Gunasekaran et al. | |
| 2009/0255187 | A1 | 10/2009 | Alexander et al. | |
| 2011/0188258 | A1 | 8/2011 | Tajima | |
| 2012/0287493 | A1 | 11/2012 | Kuhlman et al. | |
| 2013/0304049 | A1 | 11/2013 | Behnke, II et al. | |
| 2015/0331156 | A1 | 11/2015 | Hirsa | |
| 2016/0106620 | A1 | 4/2016 | Uno et al. | |
| 2017/0150252 | A1 | 5/2017 | Trestain et al. | |
| 2018/0036198 | A1 | 2/2018 | Mergl et al. | |
| 2018/0339624 | A1 | 11/2018 | Leck | |
| 2019/0023161 | A1 | 1/2019 | Sullivan et al. | |
| 2019/0059608 | A1 | 2/2019 | Yan et al. | |
| 2019/0232822 | A1 | 8/2019 | Hintermaier | |

OTHER PUBLICATIONS

Knoss, "Next-gen flexible robots move and heal like us," CU Boulder Today, Jan. 4, 2018, retrieved from the Internet: <https://www.colorado.edu/today/2018/01/04/next-gen-flexible-robots-move-and-heal-us>, [retrieved Mar. 30, 2018] (6 pages).

* cited by examiner

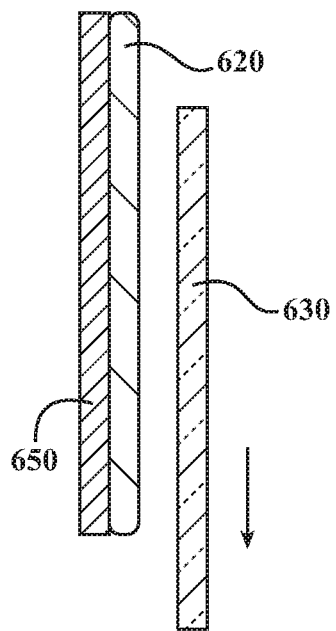 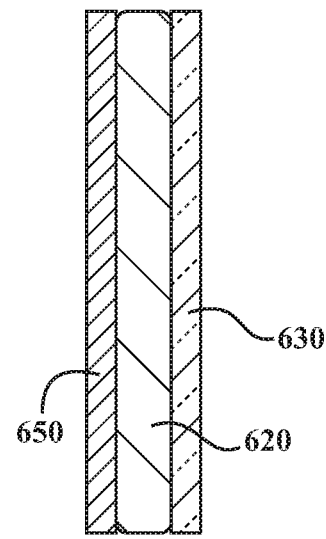
FIG. 7A    FIG. 7B
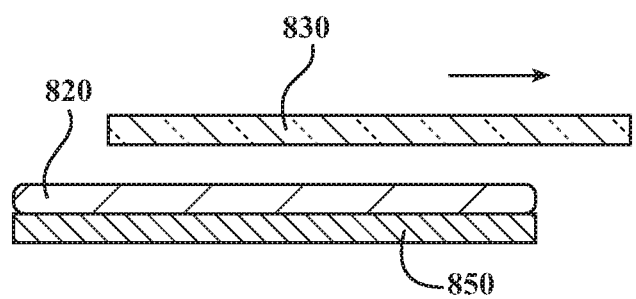
FIG. 8A
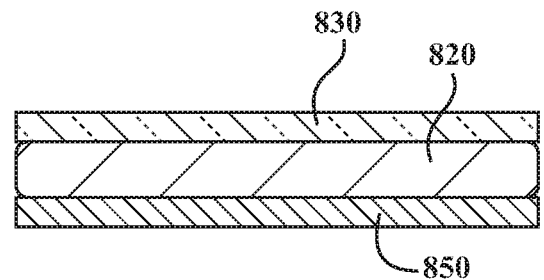
FIG. 8B

ACTIVE SEALS FOR VEHICLES

FIELD

The subject matter described herein relates to vehicle seals and, more particularly, to active vehicle seals.

BACKGROUND

By their very nature, vehicles are exposed to the elements. Depending on the environment, vehicles may be exposed to rain, mist, dirt, mud, salt, and other chemicals and debris. Seals are used in various places on vehicles to prevent infiltration of such unwanted things. Seals may also me also be used to mitigate noises that may occur as the wind interacts with seams between vehicle components.

SUMMARY

In one respect, the subject matter presented herein is directed to an active seal system for a vehicle. The system includes a first vehicle structure and a second vehicle structure. The second vehicle structure can be selectively movable relative to the first vehicle structure. An interface can be defined between the first vehicle structure and the second vehicle structure when the second vehicle structure is in a closed position. A seal can be operatively connected to the first vehicle structure or the second vehicle structure. The seal can include an outer casing and an actuator located within the outer casing. The actuator can include a bladder. The bladder can include a flexible casing. The bladder can define a fluid chamber. The fluid chamber can include a dielectric fluid. The actuator can include a first conductor and a second conductor operatively positioned on opposite portions of the bladder. The actuator can be configured such that, when electrical energy is supplied to the actuator, the actuator can be in an activated condition. In the activated condition, the seal can have a reduced cross-sectional profile such that the interface is not sealed. The actuator can be configured such that, when electrical energy is not supplied to the actuator, the actuator can be in a non-activated condition. In the non-activated condition, the interface can be substantially sealed by the seal.

In another respect, the subject matter presented herein is directed to a method of actively managing a seal operatively positioned at an interface between a first vehicle structure and a second vehicle structure. The second vehicle structure can be selectively movable relative to the first vehicle structure. The interface can be formed when the second vehicle structure is in a closed position. The seal can be operatively connected to the first vehicle structure or the second vehicle structure. The seal can include an outer casing and an actuator located within the outer casing. The actuator can include a bladder. The bladder can include a flexible casing and can define a fluid chamber. The fluid chamber can include a dielectric fluid. The actuator can include a first conductor and a second conductor operatively positioned on opposite portions of the bladder. The actuator can be configured such that actuator is in an activated condition when electrical energy is supplied to the actuator and such that the actuator is in a non-activated condition when electrical energy is not supplied to the actuator. The method can include detecting an activation condition. The method can also include, responsive to detecting an activation condition, causing the actuator to be in the activated condition. As a result, the seal can have a reduced cross-sectional profile such that the interface is not sealed.

BRIEF DESCRIPTION OF THE DRAWINGS

FIG. 7A shows a representation of the interface between vehicle door and the window when the window is moving, showing the active seal in a first configuration.

FIG. 7B shows a representation of the interface between vehicle door and the window when the window is closed, showing the active seal in a second configuration.

FIG. 8A shows a representation of the interface between vehicle structure and the sunroof when the sunroof is moving, showing the active seal in a first configuration.

FIG. 8B shows a representation of the interface between a vehicle structure and a sunroof when the sunroof is closed, showing the active seal in a second configuration.

DETAILED DESCRIPTION

Some interfaces between vehicles components can be actively managed to allow the interface to be optimized based on real-time conditions. Such active management of the interface can be achieved by using an active seal. According to arrangements herein, the seal can include an outer casing and an actuator located within the outer casing. The actuator can include a bladder filled with a dielectric fluid. The actuator can include a first conductor and a second conductor operatively positioned on opposite portions of the bladder. When electrical energy is supplied to the actuator, the actuator can be in an activated condition. In the activated condition, the seal can have a reduced cross-sectional shape relative to the interface such that the interface is not sealed. When electrical energy is not supplied to the actuator, the actuator can be in a non-activated condition. In such condition, the seal can tend to return substantially to its neutral cross-sectional shape such that the interface is substantially sealed by the seal.

Arrangements described here are used in connection with vehicles. As used herein, "vehicle" means any form of motorized transport. In one or more implementations, the vehicle can be an automobile. While arrangements will be described herein with respect to automobiles, it will be understood that embodiments are not limited to automobiles. In some implementations, the vehicle may be a watercraft, an aircraft or any other form of motorized transport.

Figure 1:
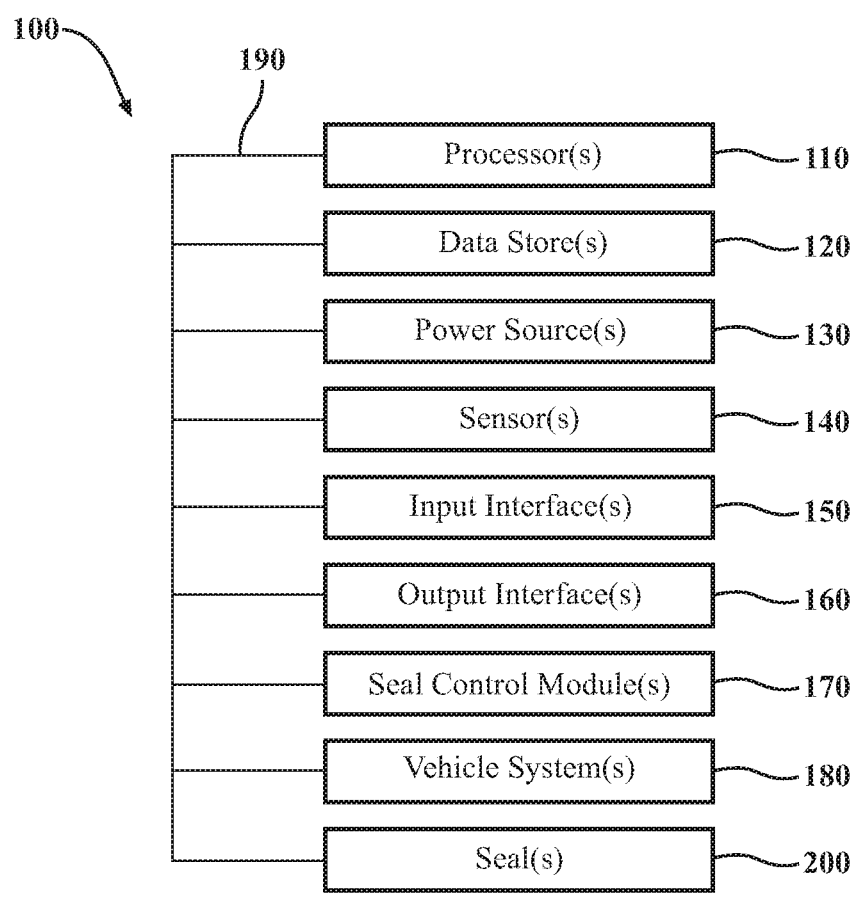
FIG. 1 depicts a view of various elements of a vehicle.

Referring to FIG. 1, an example of a vehicle 100 is shown. Some of the possible elements of the vehicle 100 are shown in FIG. 1 and will now be described. It will be understood that it is not necessary for the vehicle 100 to have all of the elements shown in FIG. 1 or described herein. The vehicle 100 can have any combination of the various elements shown in FIG. 1. Further, the vehicle 100 can have additional elements to those shown in FIG. 1. In some arrangements, the vehicle 100 may not include one or more of the elements shown in FIG. 1. Further, while the various elements may be shown as being located on or within the vehicle 100 in FIG. 1, it will be understood that one or more of these elements can be located external to the vehicle 100. Thus, such elements are not located on, within, or otherwise carried by the vehicle 100. Further, the elements shown may be physically separated by large distances. Indeed, one or more of the elements can be located remote from the vehicle 100.

The vehicle 100 can include one or more processors 110, one or more data stores 120, one or more power sources 130, one or more sensors 140, one or more input interfaces 150, one or more output interfaces 160, one or more seal control modules 170, one or more vehicle systems 180, and one or more seal(s) 200. Each of these elements will be described in turn below.

As noted above, the vehicle 100 can include one or more processors 110. "Processor" means any component or group of components that are configured to execute any of the processes described herein or any form of instructions to carry out such processes or cause such processes to be performed. The processor(s) 110 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 110 can include at least one hardware circuit (e.g., an integrated circuit) configured to carry out instructions contained in program code. In arrangements in which there is a plurality of processors 110, such processors can work independently from each other or one or more processors can work in combination with each other. In one or more arrangements, one or more processors 110 can be a main processor(s) of the vehicle 100. For instance, one or more processors 110 can be electronic control unit(s) (ECU).

The vehicle 100 can include one or more data stores 120 for storing one or more types of data. The data store 120 can include volatile and/or non-volatile memory. Examples of suitable data stores 120 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 120 can be a component of the processor(s) 110, or the data store(s) 120 can be operatively connected to the processor(s) 110 for use thereby.

As noted above, the vehicle 100 can include one or more power sources 130. The power source(s) 130 can be any power source capable of and/or configured to energize the seal(s) 200. For example, the power source 130 can include one or more batteries, one or more fuel cells, one or more generators, one or more alternators, one or more solar cells, and combinations thereof. In some arrangements, the power source(s) 130 can be configured to supply positively charged electrical energy and/or negatively charged electrical energy.

The vehicle 100 can include one or more sensors 140. "Sensor" means any device, component and/or system that can detect, determine, assess, monitor, measure, quantify, acquire, and/or sense something. The one or more sensors can detect, determine, assess, monitor, measure, quantify, acquire, and/or sense in real-time. As used herein, the term "real-time" means a level of processing responsiveness that a user or system senses as sufficiently immediate for a particular process or determination to be made, or that enables the processor to keep up with some external process.

In arrangements in which the vehicle 100 includes a plurality of sensors 140, the sensors can work independently from each other. Alternatively, two or more of the sensors can work in combination with each other. In such case, the two or more sensors can form a sensor network. The sensor(s) 140 can be operatively connected to the processor(s) 110, the data store(s) 120, and/or other elements of the vehicle 100 (including any of the elements shown in FIG. 1).

The sensor(s) 140 can be any suitable type of sensor. Various examples of different types of sensors will be described herein. However, it will be understood that the embodiments are not limited to the sensors described. The sensor(s) 140 can include sensors configured to detect and/or configured to acquire data about the various vehicle components, including one or more vehicle components in physical relation to one or more other vehicle components. For example, the sensor(s) 140 may have accelerometers, proximity detectors, pressure sensors, motion sensors, positional sensors, laser sensors, radar, lidar, sonar, calibrated actuators, a combination thereof, or the like. The sensor(s) 140 can be configured to determine a position, movement, and/or acceleration of a vehicle door. Alternatively, data acquired by the sensor(s) 140 can be used to determine a position, movement, and/or acceleration of a vehicle door. In this manner, the sensor(s) 140 or data acquired by the sensor(s) 140 can help to determine whether a vehicle door is opened, opening, closing, or closed. Further, the sensor(s) 140 can be configured to determine a position, movement, and/or acceleration of a vehicle window or sunroof. Alternatively, data acquired by the sensor(s) 140 can be used to determine a position, movement, and/or acceleration of a vehicle window or sunroof. In this manner, the sensor(s) 140 or data acquired by the sensor(s) 140 can help to determine whether a vehicle window or sunroof is opened, opening, closing, or closed.

The sensor(s) 140 can be provided in any suitable location on the vehicle 100. For example, one or more sensors 140 can be positioned on or within a door, window, or sunroof. Further, one or more sensors 140 can be positioned on or within a vehicle component or structure that is located near, neighboring, proximate to, and/or adjacent to a door, window, or sunroof.

The vehicle 100 can include an input interface 150. An "input interface" includes any device, component, system, element or arrangement or groups thereof that enable information/data to be entered into a machine. The input interface 150 can receive an input from a vehicle occupant (e.g. a driver or a passenger). Any suitable input interface 150 can be used, including, for example, a keypad, display, touch screen, multi-touch screen, button, joystick, mouse, trackball, microphone and/or combinations thereof.

The vehicle 100 can include an output interface 160. An "output interface" includes any device, component, system, element or arrangement or groups thereof that enable information/data to be presented to a vehicle occupant (e.g. a person, a vehicle occupant, etc.). The output interface 160 can present information/data to a vehicle occupant. The output interface 160 can include a display. Alternatively or in addition, the output interface 160 may include an earphone and/or speaker. Some components of the vehicle 100 may serve as both a component of the input interface 150 and a component of the output interface 160.

The vehicle 100 can include one or more modules, at least some of which will be described herein. The modules can be implemented as computer readable program code that, when executed by a processor, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively or in addition, one or more data stores 120 may contain such instructions. In another embodiment, instead of software implementations, the modules can be created exclusively using hardware, or alternatively as a combination of additional hardware with controllers with software therein.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more seal control modules 170. The seal control module(s) 170 can include profiles and logic for actively controlling seals according to arrangements herein. The seal control module(s) 170 can be configured to determine when a seal should be activated or deactivated. The seal control module(s) 170 can be configured to do so in any suitable manner. For instance, the seal control module(s) 170 can be configured to analyze data or information acquired by the sensor(s) 140. Alternatively or additionally, the seal control module(s) 170 can be configured to detect seal-related user inputs (e.g., commands) provided on the input interface(s) 150. The seal control module(s) 170 can retrieve raw data from the sensor(s) 140 and/or from the data store(s) 120. The seal control module(s) 170 can use profiles, parameters, or setting loaded into the seal control module(s) 170 and/or stored in the data store(s) 120.

The seal control module(s) 170 can analyze the data to determine an appropriate action for the seal(s) 200. The seal control module(s) 170 can be configured to cause a seal to be activated or deactivated. As used herein, "cause" or "causing" means to make, force, compel, direct, command, instruct, and/or enable an event or action to occur or at least be in a state where such event or action may occur, either in a direct or indirect manner. For instance, the seal control module(s) 170 can selectively permit or prevent the flow of electrical energy from one or more power sources 130 to one or more seals 200. The seal control module(s) 170 can be configured send control signals or commands over the communication network 190 to the seal(s) 200.

The vehicle can include one or more vehicle systems 180. The one or more vehicle systems 180 can include a propulsion system, a braking system, a steering system, throttle system, a transmission system, and a signaling system. Each of these systems can include one or more mechanisms, devices, elements, components, systems, and/or combination thereof, now known or later developed. The above examples of the vehicle systems 180 are non-limiting. Indeed, it will be understood that the vehicle systems 180 can include more, fewer, or different vehicle systems. It should be appreciated that although particular vehicle systems are separately defined, each or any of the systems or portions thereof may be otherwise combined or segregated via hardware and/or software within the vehicle.

The vehicle 100 can include one or more seals 200. The seal(s) 200 will be described in greater detail below in connection with FIG. 2. The seal(s) 200 can be used in various locations within the vehicle 100, some of which will be described herein.

The various elements of the vehicle 100 can be communicatively linked to one another or one or more other elements through one or more communication networks 190. As used herein, the term "communicatively linked" can include direct or indirect connections through a communication channel, bus, pathway or another component or system. A "communication network" means one or more components designed to transmit and/or receive information from one source to another. The data store(s) 120 and/or one or more other elements of the vehicle 100 can include and/or execute suitable communication software, which enables the various elements to communicate with each other through the communication network and perform the functions disclosed herein.

The one or more communication networks 190 can be implemented as, or include, without limitation, a wide area network (WAN), a local area network (LAN), the Public Switched Telephone Network (PSTN), a wireless network, a mobile network, a Virtual Private Network (VPN), the Internet, a hardwired communication bus, and/or one or more intranets. The communication network 190 further can be implemented as or include one or more wireless networks, whether short range (e.g., a local wireless network built using a Bluetooth or one of the IEEE 802 wireless communication protocols, e.g., 802.11a/b/g/i, 802.15, 802.16, 802.20, Wi-Fi Protected Access (WPA), or WPA2) or long range (e.g., a mobile, cellular, and/or satellite-based wireless network; GSM, TDMA, CDMA, WCDMA networks or the like). The communication network can include wired communication links and/or wireless communication links. The communication network can include any combination of the above networks and/or other types of networks.

Figure 2A:
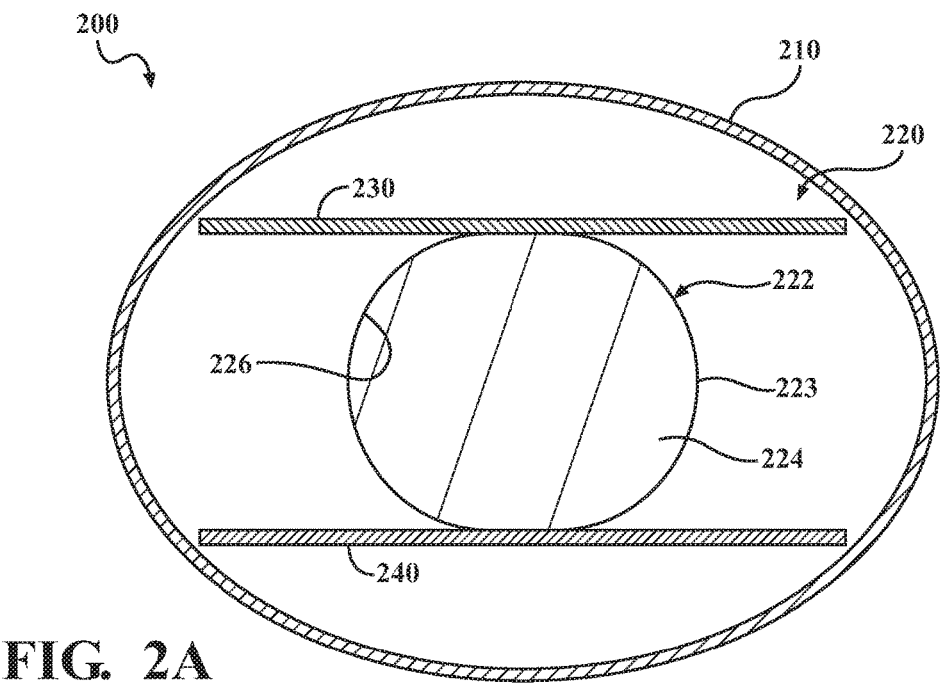
FIG. 2A depicts an example of an active seal, showing a non-actuated condition.
Figure 2B:
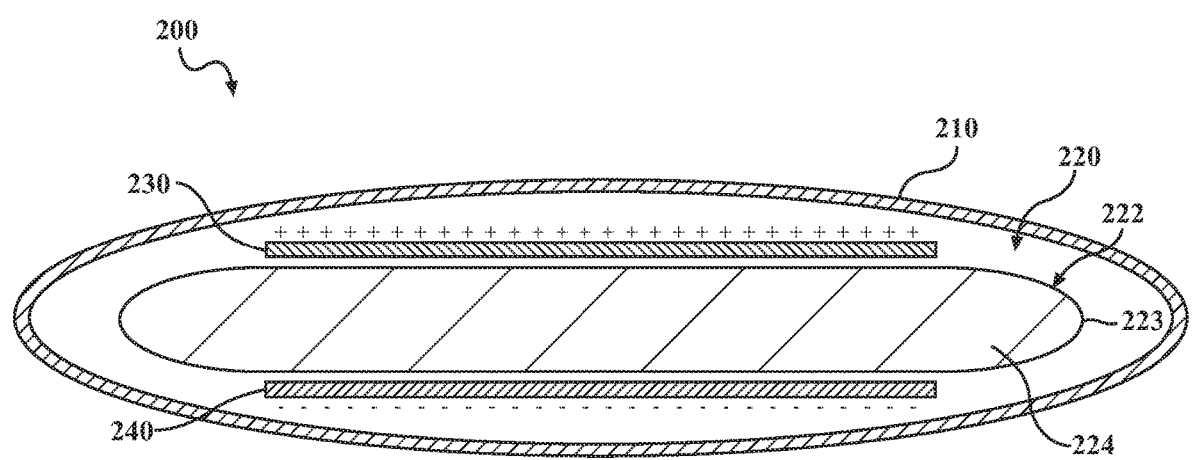
FIG. 2B depicts an example of the active seal, showing an actuated condition.

Referring to FIGS. 2A-2B, a cross-sectional view of an example of an example of a seal 200 is shown. The seal 200 can include an outer casing 210 and one or more actuators 220. The actuator(s) 220 can be located within the outer casing 210. The actuator(s) 220 can be configured to selectively morph the overall cross-sectional shape of the seal 200. FIG. 2A shows an example of the seal 200 in a non-activated condition, and FIG. 2B shows an example of the seal 200 in an activated condition.

In this example, the non-activated cross-sectional shape of the seal 200 can be substantially circular, and the activated cross-sectional shape of the seal can be a substantially oval shape with an overall smaller height dimension (the top to bottom direction of the page in FIGS. 2A and 2B). It will be understood that other shapes are possible. As used herein, the term "substantially" includes exactly the term it modifies and slight variations therefrom. Thus, the term "substantially circular" means exactly circular and slight variations therefrom. Slight variations therefrom can include being within normal manufacturing tolerances, within about 10 degrees/percent/units or less, within about 5 degrees/percent/units or less, within about 4 degrees/percent/units or less, within about 3 degrees/percent/units or less, within about 2 degrees/percent/units or less, or within about 1 degrees/percent/unit or less.

The outer casing 210 can be made of any material suitable for sealing purposes. The outer casing 210 can have any suitable configuration based on the particular application of the seal 200. In one or more arrangements, a portion of the outer casing 210 may be attached to a portion of the actuator 220. Any suitable form of attachment can be provided, such as one or more adhesives, one or more fasteners, and/or one or more forms of mechanical engagement.

The actuator 220 can have a body that is, at least in large part, made of a soft, flexible material. The actuator 220 can include a bladder 222 containing a dielectric fluid 224. The bladder 222 can include a casing 223. The casing 223 can be made of a single piece of material, or a plurality of separate pieces of material that are joined together. An inner surface 226 of the outer casing 210 can define a fluid chamber. In one or more arrangements, the bladder 222 and/or fluid chamber can be fluid impermeable.

The bladder 222 can be made of any suitable material. For example, the bladder 222 can be made of an insulating material. The insulating material can be flexible. The insulating material can be a polymer and/or an elastomeric polymer (elastomer). The polymers or elastomers can be natural or synthetic in nature. In one or more arrangements, the insulating material can be silicone rubber. Additional examples of the insulating material include nitrile, ethylene propylene diene monomer (EPDM), fluorosilicone (FVMQ), vinylidene fluoride (VDF), hexafluoropropylene (HFP), tetrafluoroethylene (TFE), perfluoromethylvinylether (PMVE), polydimethylsiloxane (PDMS), natural rubber, neoprene, polyurethane, silicone, or combinations thereof.

A dielectric fluid 224 can be any suitable material. In one or more arrangements, the dielectric fluid 224 can be ethylene glycol. As an additional example, the dielectric fluid 224 can include transformer oil or mineral oil. In one or more arrangements, the dielectric fluid 224 can be a lipid based fluid, such as a vegetable oil-based dielectric fluid.

The dielectric fluid 224 can have various associated properties. The dielectric fluid 224 can have an associated dielectric constant. In one embodiment, the dielectric fluid 224 can have a dielectric constant of 1 or greater, 2 or greater, 3 or greater, 4 or greater, 5 or greater, 6 or greater, 7 or greater, 8 or greater, 9 or greater, 10 or greater, 20 or greater, 30 or greater, 40 or greater, 50 or greater, or higher.

In one or more arrangements, the dielectric fluid 224 can be a fluid that is resistant to electrical breakdown. In one or more arrangements, the dielectric fluid 224, can provide electrical insulating properties. In one or more arrangements, the dielectric fluid 224 can provide electrical insulating properties. In one or more arrangements, the dielectric fluid 224 can prevent arcing between surrounding conductors.

The actuator 220 can include a plurality of conductors. In the example shown in FIGS. 2A-2B, the actuator 220 can include a first conductor 230 and a second conductor 240. The conductors 230, 240 can conduct electrical energy. The conductors 230, 240 can be made of any suitable material, such as a conductive elastomer. In one or more arrangements, the conductors 230, 240 can be made of natural rubber with carbon or other conductive particles distributed throughout the material. The conductors 230, 240 can be made of the same material as each other, or the conductors 230, 240 can be made of different materials. One or more of the conductors 230, 240 can be formed by a single, continuous structure, or one or more of the conductors 230, 240 can be formed by a plurality of separate structures.

The first conductor 230 and the second conductor 240 can be located on opposite sides or portions of the bladder 222. Thus, the first conductor 230 and the second conductor 240 can be separated by the bladder 222. The first conductor 230 and/or the second conductor 240 can be operatively connected to the bladder 222 in any suitable manner. In some instances, the first conductor 230 and/or the second conductor 240 can be embedded within a wall of the bladder 222. In one or more arrangements, the first conductor 230 can be operatively positioned between the bladder 222 and an insulating material. In such case, the first conductor 230 can be substantially encapsulated by the bladder 222 and the insulating material. Also, the second conductor 240 can be operatively positioned between the bladder 222 and an insulating material. In one or more arrangements, the second conductor 240 can be substantially encapsulated by the bladder 222 and the insulating material. In one or more arrangements, the insulating material can be made of an insulating elastomer. Thus, it will be appreciated that, at least in some instances, the insulating material can define exterior surfaces of the actuator 220. In one or more arrangements, the insulating material can be at least a portion of the outer casing 210.

Each of the conductors 230, 240 can be operatively connected to receive electrical energy from a power source (e.g. power source(s) 130). As a result, electrical energy can be selectively supplied to each individual conductors 230, 240.

The seal 200 can have a non-actuated mode and an actuated mode. Each of these modes will be described in turn. FIG. 2A shows an example of a non-actuated mode of the seal 200. In such case, electrical energy is not supplied to the first conductor 230 and the second conductor 240. Thus, the first conductor 230 and the second conductor 240 can be spaced apart from each other. The bladder 222 can be in a neutral state. In one or more instances, the bladder 222 can be substantially circular in this condition. In one or more instances, the bladder 222 does extend beyond the outer edges of the first conductor 230 and the second conductor 240.

FIG. 2B shows an example of an actuated mode of the seal 200. In the actuated mode, power can be supplied to the first conductor 230 and the second conductor 240. In one implementation, the first conductor 230 can become positively charged, and the second conductor 240 can become negatively charged. Thus, the first conductor 230 and the second conductor 240 can be oppositely charged. As a result, the first conductor 230 and the second conductor 240 can be attracted toward each other. The attraction between the first conductor 230 and the second conductor 240 can cause them and the respective portions of the bladder 222 to move toward each other. As a result, at least a portion of the dielectric fluid 224 within the fluid chamber can be squeezed toward the outer peripheral region(s) of the bladder 222. Thus, the cross-sectional shape of the actuator 220 and, thus, the cross-sectional shape of the seal 200 can become slimmer in the height direction (the top to bottom direction of the page in FIG. 2B). In some instances, the cross-sectional shape of the seal 200 can become substantially oval. In at least some instances, the outer peripheral region(s) of the bladder 22 may bulge or stretch beyond the outer edges of the first conductor 230 and the second conductor 240.

Figure 3:
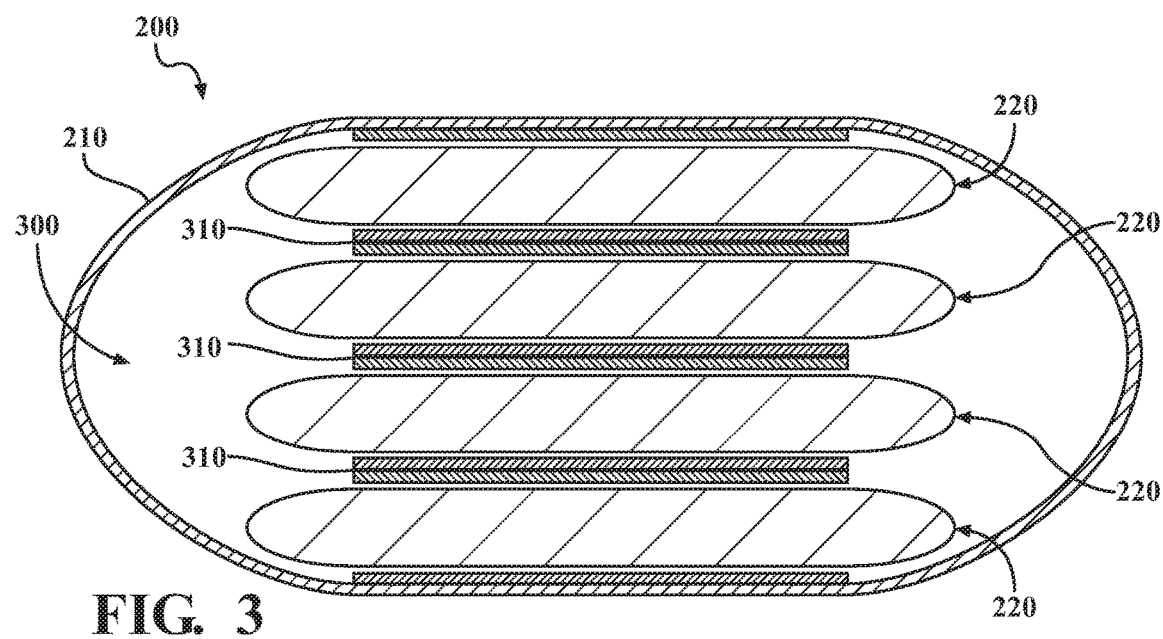
FIG. 3 depicts an example of a plurality of actuators arranged in a stack.

Turning now to FIG. 3, an example is shown of an arrangement in which there is a plurality of actuators 220. The plurality of actuators 220 can be arranged in a stack 300.

The above-description of the actuator 220 in connection with FIGS. 2A-2B applies equally to the individual actuators 220 in the stack 300. It will be appreciated that, in going from the non-actuated mode to the actuated mode, the overall height (the top to bottom direction on the page) of the stack 300 can decrease. In such arrangements, it will be appreciated that the actuators 220 in the stack 300 can be actuated individually, collectively, or any combination of two or more of the actuators 220 can be actuated at the same time. In some arrangements, neighboring actuators 220 can be separated by insulating layers 310. In some arrangements, such insulating layers can be provided when there is only a single actuator 220.

The seals 200 described herein can be used in a variety of locations within the vehicle 100. Non-limiting examples of various vehicular locations are shown and described in connection with FIGS. 4-8.

Figure 4:
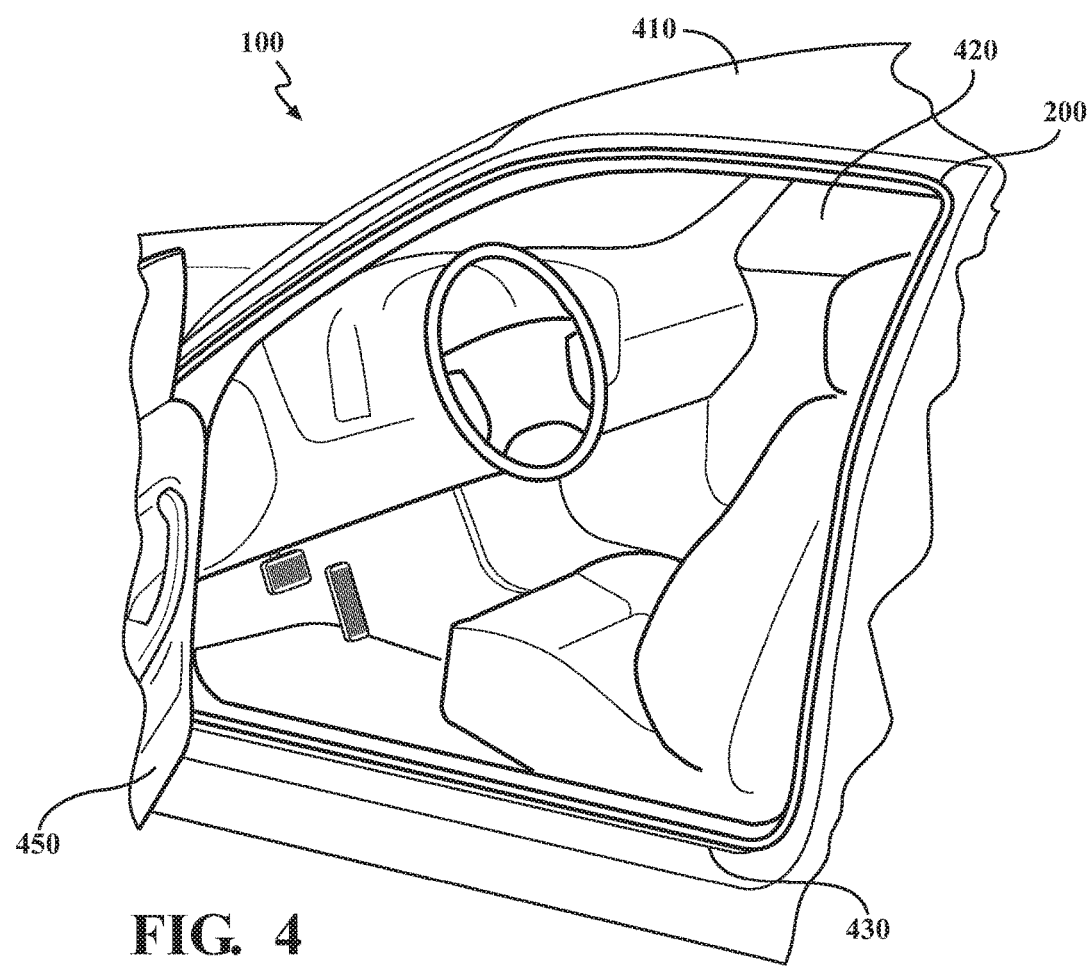
FIG. 4 is a view of a portion of a vehicle, showing an active seal operatively positioned within an interface between a rocker panel and a door.

One area of a vehicle in which an active seal described herein can be used is at the interface between a vehicle door and a rocker panel. Referring to FIG. 4, a portion of the vehicle 100 is shown. The vehicle 100 can have a vehicle body 410. A door opening 420 can be defined in or by the vehicle body 410. A rocker panel 430 can be a part of vehicle body 410. The rocker panel 430 can serve as an interface for a vehicle door 450. When the vehicle door 450 is open, ingress or ingress is permitted. The vehicle door 450 may be shut to secure the vehicle when turned off or for travel.

According to arrangements herein, the active seal 200 can be operatively positioned with respect to the interface between the rocker panel 430 and the vehicle door 450. For instance, in one or more arrangements, the seal 200 can be operatively connected to the rocker panel 430. In one or more arrangements, the seal 200 can extend around the entire rocker panel 430. In one or more arrangements, the seal 200 can be operatively connected to the vehicle door 450, such as those portions that form an interface with the rocker panel 430. The operation of the seal 200 in this environment will now be described.

Figure 5A:
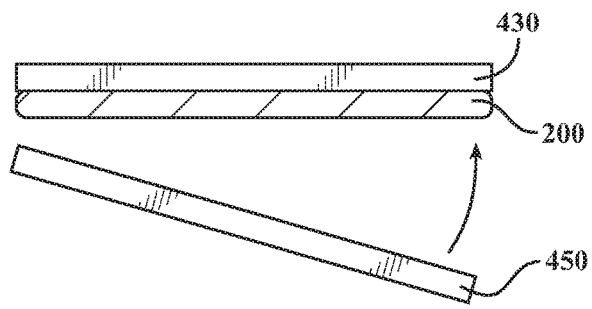
FIG. 5A shows a representation of the interface between the door and the rocker panel when the door is closing, showing the active seal in a first configuration.

FIG. 5A shows a scenario in which the vehicle door 450 is in the process of being closed. The seal control module(s) 170 can detect that the door 450 is closing. For instance, the seal control module(s) 170 can detect that the door is closing based on data or information acquired by the sensor(s) 140 (e.g., accelerometers, door proximity sensors, etc.). Alternatively or in addition, the seal control module(s) 170 can detect that the door is closing based on a door close command provided by a user on one of the input interfaces 150. As an example, a user a press a button to indicate that the user wishes the door to automatically close.

When it is determined that the vehicle door 450 is closing, the seal control module(s) 170 can cause the seal 200 to be activated. The seal control module(s) 170 can allow electrical energy from the power source(s) 130 to be received by the actuator(s) 220 of the seal 200. Thus, the cross-sectional profile of the seal 200 can become slimmer, such as is shown in FIG. 2B. In such condition, the possibility of the seal 200 interfering with the closing of the vehicle door 450 can be minimized. It will be appreciated that the same process can be used when it is determined that the vehicle door 450 is being opened.

It should be noted that the seal 200 can be activated at other times. For instance, the seal 200 can be activated at any time the vehicle door 450 is in an opened state or at any time the vehicle 100 is powered while the vehicle door is in an opened condition or while being closed.

Figure 5B:
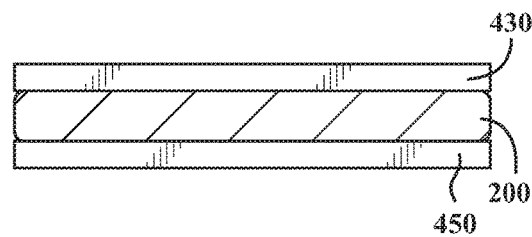
FIG. 5B shows a representation of the interface between the door and the rocker panel when the door is closed, showing the active seal in a second configuration.

FIG. 5B shows a scenario in which the vehicle door 450 is closed. The seal control module(s) 170 can detect that the door 450 is closed and/or has stopped moving. For instance, the seal control module(s) 170 can detect that the door is closed and/or has stopped moving based on data or information acquired by the sensor(s) 140 (e.g., accelerometers, door proximity sensors, motion sensors, pressure sensors, etc.). Alternatively or in addition, the seal control module(s) 170 can detect that the door is closed based on a user input provided on one of the input interfaces 150. As an example, a user a press a button to indicate that the door is closed. Still further, the seal control module(s) 170 can detect that the door 450 is closed based on the completion of an electrical circuit.

When it is determined that the vehicle door 450 is closed, the seal control module(s) 170 can cause the seal 200 to be deactivated. The seal control module(s) 170 can discontinue the supply of electrical energy from the power source(s) 130 to the actuator(s) 220 of the seal 200. As a result, the seal 200 can tend to return to the non-activated condition, such as is shown in FIG. 2A, to substantially seal against the vehicle door 450 and the rocker panel 430, thereby substantially sealing the interface. It will be appreciated that, due to the presence of the vehicle door 450 and the limited space in the interface, the seal 200 may not be able to fully return to the non-activated condition. As a result, the force exerted by the seal 200 will increase and may provide improved sealing.

Figure 6:
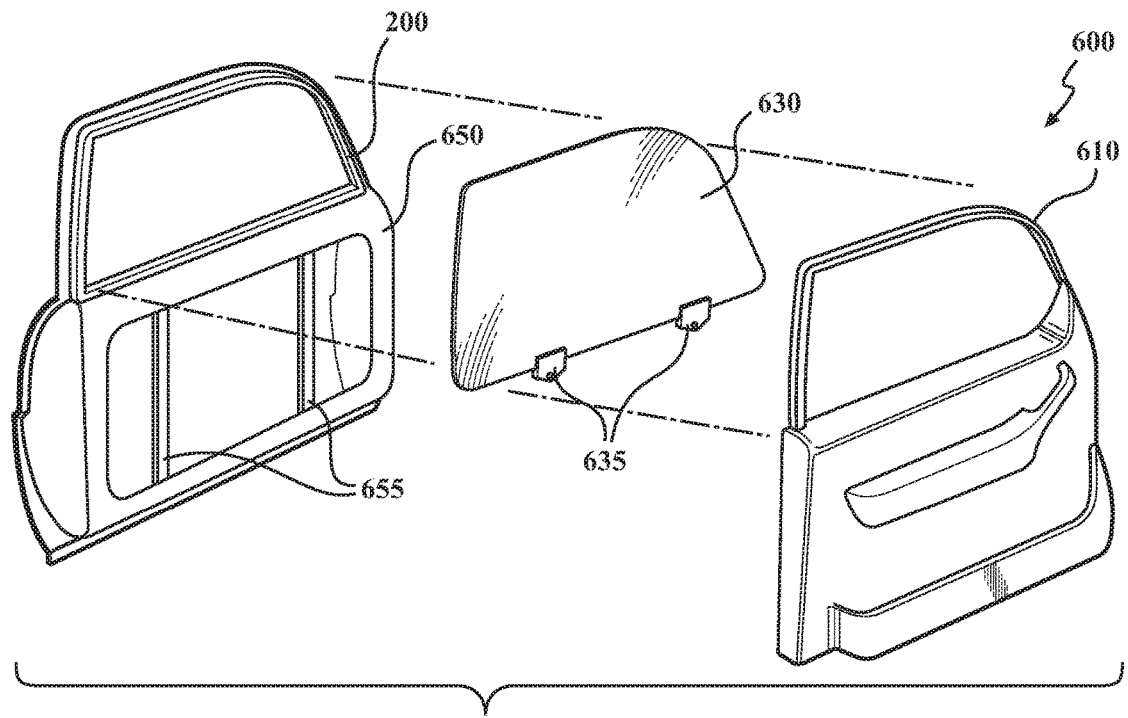
FIG. 6 shows an exploded view of an example of a vehicle door that includes an active seal.

Another area of a vehicle in which an active seal described herein can be used is at the interface between a vehicle door and a window. Referring to FIG. 6, an exploded view of the vehicle door 600 is shown. The door 600 can include an inner door panel 610, a window 630, and outer door panel 650. The window 630 can be movable within the door in any suitable manner, now known or later developed. As an example, the window 630 can have one or more glides 635 that operatively engage with one or more guide tracks 655. The glides 635 can move within the guide tracks 655. The glides 635 and guide tracks 655 can facilitate the movement of the window 630 to move up or down within the door 600. The glides 635 can slide within the guide tracks 655. There can be other elements associated with the window to facilitate its movements, such as a motor, manual crank, etc.

According to arrangements herein, an active seal 200 can be operatively positioned with respect to the interface between the window 630 and one of the door panels (e.g., the outer door panel 650 or the inner door panel 610). For instance, in one or more arrangements, the seal 200 can be operatively connected to the outer door panel 650. In one or more arrangements, the seal 200 can extend around the entire window opening in the outer door panel 650. Alternatively or additionally, the seal can be operatively connected to the inner door panel 610. The operation of the seal 200 in this environment will now be described.

FIG. 7A shows a scenario in which the window 630 is in the process of being opened. The seal control module(s) 170 can detect that the window 630 is moving. For instance, the seal control module(s) 170 can detect that the door is moving based on data or information acquired by the sensor(s) 140 (e.g., accelerometers, proximity sensors, etc.). Alternatively or in addition, the seal control module(s) 170 can detect that the door is closing based on a window command provided by a user on one of the input interfaces 150. As an example, a user can press a button or switch in the cabin of the vehicle to cause the window to open or close.

When it is determined that the window is moving, the seal control module(s) 170 can cause the seal 200 to be activated. The seal control module(s) 170 can allow electrical energy from the power source(s) 130 to be received by the actuator(s) 220 of the seal 200. Thus, the cross-sectional profile of the seal 200 can become slimmer, such as is shown in FIG. 2B. In such condition, the possibility of the seal 200 interfering with and/or resisting the movement of the window 630 can be minimized. It will be appreciated that the same process can be used when it is determined that the window is being closed.

It should be noted that the seal 200 can be activated at other times. For instance, the seal 200 can be activated at any time the vehicle door 450 is in an opened state or at any time the vehicle 100 is powered while the vehicle door is in an opened condition or while being closed.

FIG. 7B shows a scenario in which the window 630 is closed. The seal control module(s) 170 can detect that the window 630 is closed and/or has stopped moving. For instance, the seal control module(s) 170 can detect that the window 630 is closed and/or has stopped moving based on data or information acquired by the sensor(s) 140 (e.g., accelerometers, door proximity sensors, motion sensors, pressure sensors, etc.). Alternatively or in addition, the seal control module(s) 170 can detect that the window 630 is closed and/or has stopped moving based on a user input provided on one of the input interfaces 150 or the cessation of such an input. As an example, a user may continuously engage a window up or a window down switch until the window 630 is at a desired location. When the window is at the desired location, the user may release the switch. In such case, the seal control module(s) 170 can determine that the window is at a desired location. Still further, the seal control module(s) 170 can detect that the window 630 is closed based on the completion of an electrical circuit.

When it is determined that the window 630 is closed, the seal control module(s) 170 can cause the seal 200 to be deactivated. The seal control module(s) 170 can discontinue the supply of electrical energy from the power source(s) 130 to the actuator(s) 220 of the seal 200. As a result, the seal 200 can tend to return to the non-activated condition, such as is shown in FIG. 2A, to substantially seal against the window 630 and the outer door panel 650, thereby substantially sealing the interface. It will be appreciated that, due to the presence of the window 630, the seal 200 may not be able to fully return to the non-activated condition.

Another area of a vehicle in which an active seal described herein can be used is at the interface between a vehicle body member and a sunroof or other moving panel (e.g., moon roof, trunk, hood, gasoline door, etc.). FIG. 8A shows a scenario in which a sunroof 830 is in the process of being opened. FIG. 8B shows a scenario in which the sunroof 830 is closed. The above discussion of the operation of the seal control module(s) 170 and the seal 200 made in connection with FIGS. 4-7 applies equally to the arrangements shown in FIGS. 8A-8B.

Now that the various potential systems, devices, elements and/or components of the vehicle 100 have been described, various methods will now be described. Various possible steps of such methods will now be described. The methods described may be applicable to the arrangements described above in relation to FIGS. 1-8, but it is understood that the methods can be carried out with other suitable systems and arrangements. Moreover, the methods may include other steps that are not shown here, and in fact, the methods are not limited to including every step shown. The blocks that are illustrated here as part of the methods are not limited to the particular chronological order. Indeed, some of the blocks may be performed in a different order than what is shown and/or at least some of the blocks shown can occur simultaneously.

Figure 9:
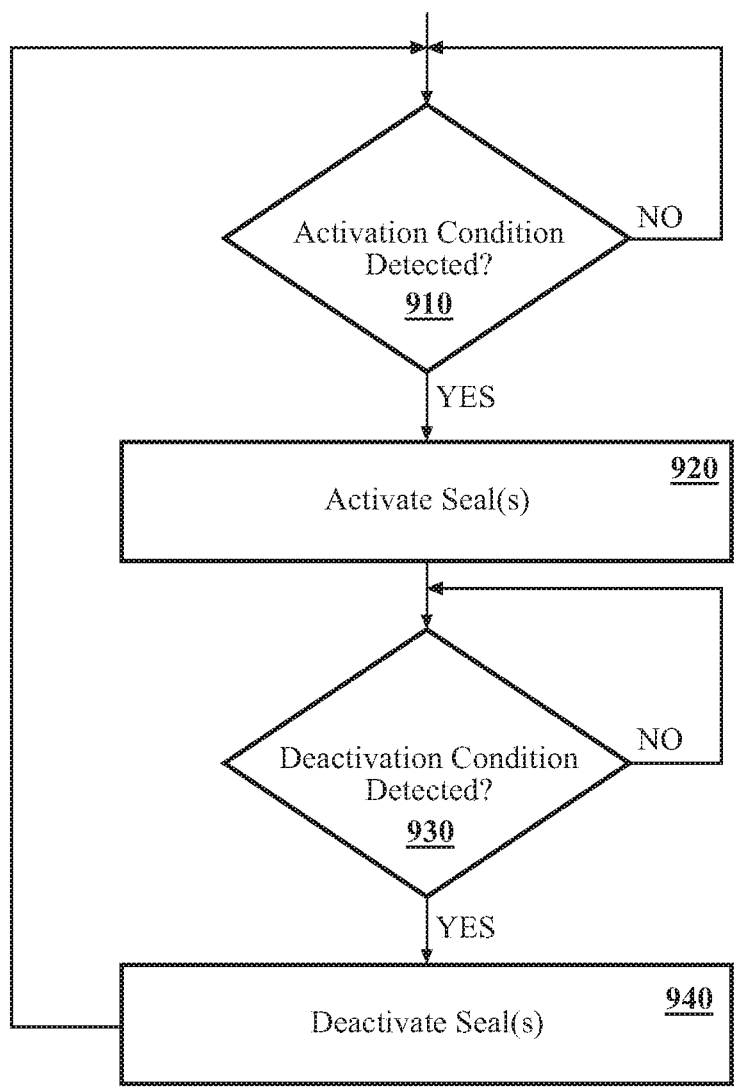
FIG. 9 is an example of an active seal method.

Turning to FIG. 9, an example of an active seal method 900 is shown. For the sake of discussion, the method 900 can begin with the seal in a non-activated mode, such as is shown in FIG. 2A. In the non-activated mode, electrical energy from the power source(s) 130 is not supplied to the actuator(s) 220 of the seal(s) 200. At block 910, it can be determined whether an activation condition has been detected. The activation condition may be detected by the seal control module(s) 170 when a user input is provided, such as on the input interface(s) 150. As an example, a user may provide an input to open or close a window, or a user may provide an input to open or close a sunroof. Alternatively or in addition, the activation condition may be detected by the seal control module(s) 170, the processor(s) 110, and/or one or more sensor(s) 140 detecting an event, condition, or other parameter. For instance, the seal control module(s) 170 can detect that the vehicle door is closing, the vehicle window is opening or closing, and/or that the vehicle sunroof is opening or closing, as described above.

If an activation condition is not detected, the method 900 can end, return to block 910, or proceed to some other block. However, if an activation condition is detected, then the method can proceed to block 920. At block 920, the seal(s) 200 can be activated. Thus, the seal control module(s) 170 and/or the processor(s) 110 can cause the flow of electrical energy from the power sources(s) 130 to the actuator(s) 220 of the seal(s) 200.

As a result, the first conductor 230 and the second conductor 240 can become oppositely charged, which causes them to attract each other. As a result, the cross-sectional shape of the seal 200 can morph to an activated shape. The method can continue to block 930.

At block 930, it can be determined whether deactivation condition has been detected. The deactivation condition may be detected by the seal control module(s) 170, such as by detecting a user input, the cessation of a user input, and/or based on data acquired by the sensor(s) 140. If a deactivation condition is not detected, the method 900 can return to block 930, or proceed to some other block. However, if a deactivation condition is detected, then the method can proceed to block 940. At block 940, the seal(s) 200 can be deactivated. Thus, the seal control module(s) 170 and/or the processor(s) 110 can cause the flow of electrical energy from the power sources(s) 130 to the seal(s) 200 to be discontinued.

The method 900 can end. Alternatively, the method 900 can return to block 910 or some other block.

It will be appreciated that arrangements described herein can provide numerous benefits, including one or more of the benefits mentioned herein. For example, arrangements described herein can facilitate the movement of vehicle components. Arrangements described herein can reduce seal wear. Arrangements described herein can avoid the use of large and complicated gears and actuators, thereby enabling more compact designs and packaging. Arrangements described here can provide for more efficient use of power.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . ." as used herein refers to and encompasses any and all possible combinations of one or more of the associated listed items. As an example, the phrase "at least one of A, B and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. An active seal system for a vehicle comprising:
   a first vehicle structure;
   a second vehicle structure, the second vehicle structure being selectively movable relative to the first vehicle structure, an interface being defined between the first vehicle structure and the second vehicle structure when the second vehicle structure is in a closed position;
   a seal operatively connected to the first vehicle structure or the second vehicle structure, the seal including an outer casing and an actuator located within the outer casing, the actuator including:
      a bladder, the bladder including a flexible casing and defining a fluid chamber, the fluid chamber including a dielectric fluid; and
      a first conductor and a second conductor operatively positioned on opposite portions of the bladder,
      the actuator being configured such that:
         when electrical energy is supplied to the actuator, the actuator is in an activated condition, whereby the actuator has a reduced cross-sectional profile, whereby the interface is not sealed, and
         when electrical energy is not supplied to the actuator, the actuator is in a non-activated condition, whereby the interface is substantially sealed.

2. The system of claim 1, wherein the second vehicle structure is a door, and wherein the first vehicle structure is a rocker panel.

3. The system of claim 1, wherein the second vehicle structure is a window, and wherein the first vehicle structure is a door panel.

4. The system of claim 1, wherein the second vehicle structure is a sunroof.

5. The system of claim 1, wherein at least a portion of the actuator is operatively connected to the outer casing of the seal.

6. The system of claim 1, wherein the actuator is a plurality of actuators.

7. The system of claim 6, wherein the plurality of actuators are arranged in a stack.

8. The system of claim 1, further including:
   one or more power sources operatively connected to supply electrical energy to the seal; and
   one or more processors operatively connected to selectively control a supply of electrical energy from the one or more power sources to the seal.

9. The system of claim 8, further including an input interface operatively connected to the one or more processors, wherein the one or more processors are configured to selectively control the supply of electrical energy from the one or more power sources to the seal based on inputs received on the input interface or a discontinuation of an input provided on the input interface.

10. The system of claim 8, further including one or more sensors operatively connected to the one or more processors, wherein the one or more processors are configured to selectively control the supply of electrical energy from the one or more power sources to the seal based on sensor data acquired by the one or more sensors.

11. The system of claim 10, wherein the sensor data includes data about a movement or a position of the second vehicle structure.

12. The system of claim 1, wherein, when electrical energy is supplied to the actuator, the first conductor and the second conductor become oppositely charged, whereby the first conductor and the second conductor are electrostatically attracted toward each other to cause the seal to morph into the activated condition.

13. A method of actively managing an interface between a first vehicle structure and a second vehicle structure, the second vehicle structure being selectively movable relative to the first vehicle structure, the interface being formed when the second vehicle structure is in a closed position, a seal being operatively connected to the first vehicle structure or the second vehicle structure, the seal including an outer casing and an actuator located within the outer casing, the actuator including a bladder, the bladder including a flexible casing and defining a fluid chamber, the fluid chamber including a dielectric fluid, the actuator including a first conductor and a second conductor operatively positioned on opposite portions of the bladder, the actuator being configured such that actuator is in an activated condition when electrical energy is supplied to the actuator and such that the actuator is in a deactivated condition when electrical energy is not supplied to the actuator, the method comprising:
   detecting an activation condition; and
   responsive to detecting the activation condition, causing the actuator to be in the activated condition, whereby the actuator has a reduced cross-sectional profile, and whereby the interface is not sealed.

14. The method of claim 13, wherein causing the actuator to be in the activated condition includes permitting electrical energy to be supplied to the seal from a power source operatively connected thereto.

15. The method of claim 13, wherein the second vehicle structure is a door, and wherein the first vehicle structure is a rocker panel.

16. The method of claim 13, wherein the second vehicle structure is a window, and wherein the first vehicle structure is a door panel.

17. The method of claim 13, wherein the second vehicle structure is a sunroof.

18. The method of claim 13, wherein detecting the activation condition is based on an input received on an input interface or a discontinuation of an input provided on the input interface.

19. The method of claim 13, wherein detecting the activation condition is based on sensor data acquired by the one or more sensors.

20. The method of claim 13, further including:
   detecting a deactivation condition; and
   responsive to detecting the deactivation condition, causing the actuator to be in the deactivated condition, whereby the interface is substantially sealed by the seal.

* * * * *